No. 626,581. Patented June 6, 1899.
A. WHELAN.
APPARATUS FOR CONTROLLING HORSES.
(Application filed Nov. 4, 1898.)
(No Model.) 2 Sheets—Sheet 1.
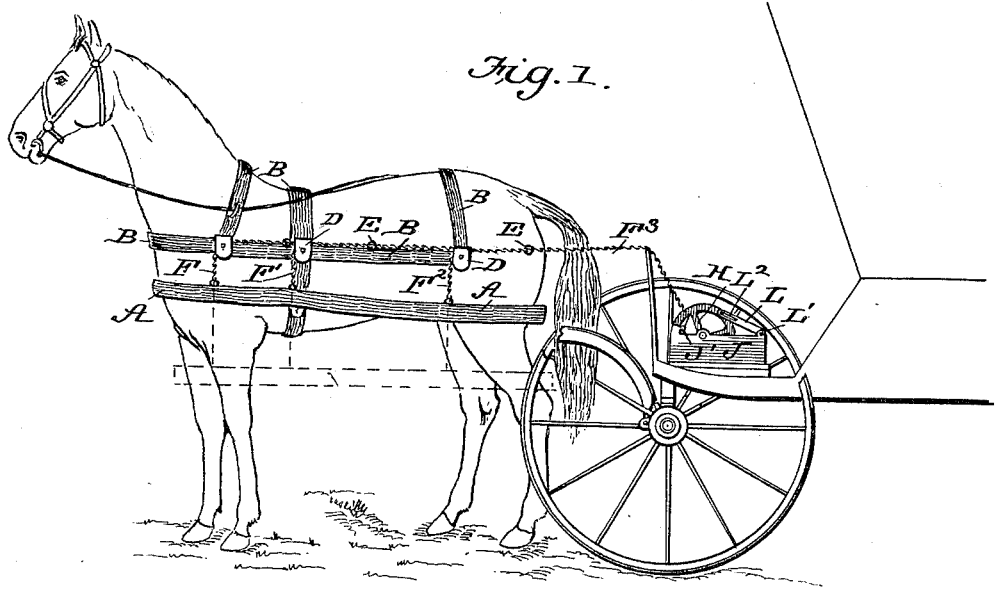
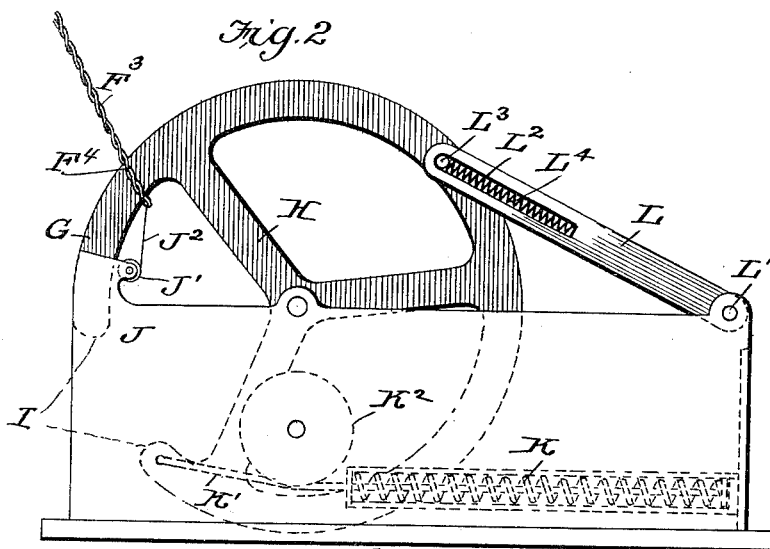
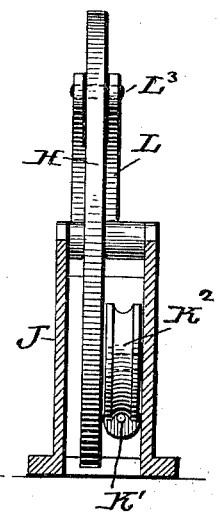
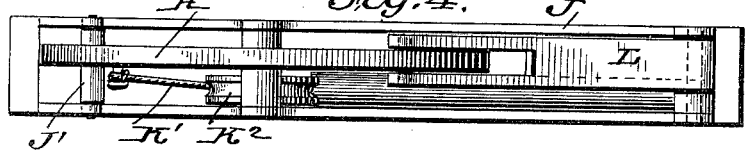
WITNESSES:
M. D. Blondel,
P. B. Turpin.
INVENTOR
Alexander Whelan.
BY Munn & Co.
ATTORNEYS.

No. 626,581. Patented June 6, 1899.
A. WHELAN.
APPARATUS FOR CONTROLLING HORSES.
(Application filed Nov. 4, 1898.)
(No Model.) 2 Sheets—Sheet 2.
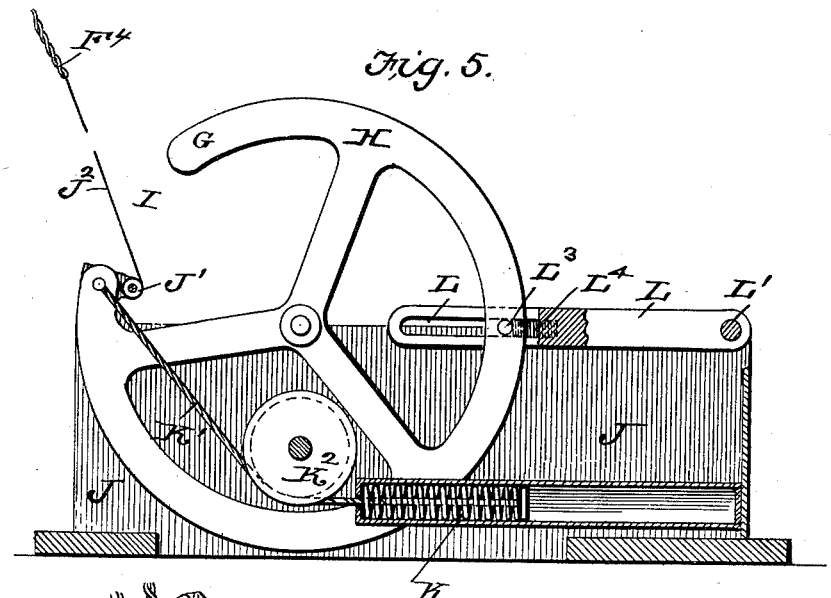
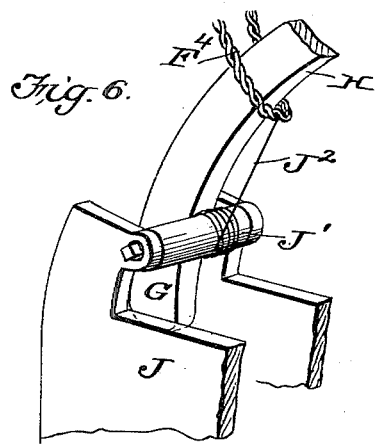
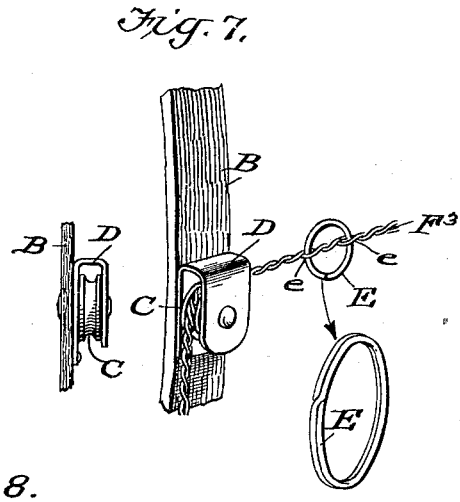
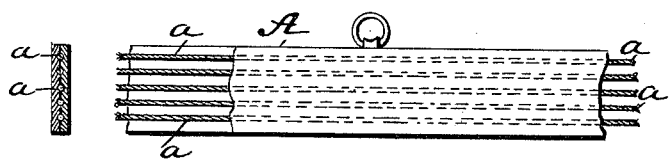
WITNESSES:
M. D. Blondel,
P. B. Turpin,
INVENTOR
Alexander Whelan.
BY Munn & Co.
ATTORNEYS.

UNITED STATES PATENT OFFICE.

ALEXANDER WHELAN, OF WASHINGTON, DISTRICT OF COLUMBIA, ASSIGNOR OF ONE-HALF TO JAMES A. WHELAN, OF SAME PLACE.

APPARATUS FOR CONTROLLING HORSES.

SPECIFICATION forming part of Letters Patent No. 626,581, dated June 6, 1899.

Application filed November 4, 1898. Serial No. 695,474. (No model.)

*To all whom it may concern:*

Be it known that I, ALEXANDER WHELAN, residing in Washington, in the District of Columbia, have made certain new and useful Improvements in Apparatus for Controlling Horses, of which the following is a specification.

My invention is an improved apparatus for use in controlling horses, whereby to prevent them from running away; and the invention consists in certain novel constructions and combinations of parts, as will be hereinafter described, and pointed out in the claims.

In the drawings, Figure 1 is a side view of the apparatus as in use. Fig. 2 is a side view, Fig. 3 an end view, and Fig. 4 a top plan view, of the line-securing device. Fig. 5 is a vertical longitudinal section of the line-securing device with the hook-wheel in open position. Fig. 6 is a detail perspective view illustrating the parts of the line-securing device adjacent to the point of the hook. Fig. 7 illustrates in detail the guide-pulley for the line-wire and the stop-ring on such wire, and Fig. 8 illustrates in detail the means for reinforcing the band.

By my invention I provide a band A, adapted to form an inclosure around the animal's legs when dropped to the dotted-line position shown in Fig. 1, and means whereby the band may be raised and lowered, so it can be adjusted up around the animal's body, as shown in full lines, Fig. 1, when it is not required for use and can be quickly dropped to the dotted-line position shown in Fig. 1 whenever the horse becomes fractious or attempts to run away. When the band is in this dotted position, it is evident the animal's legs will be so secured together that it cannot run away, but can be quickly brought under perfect control. The band is made of suitable material, preferably of leather of suitable strength reinforced longitudinally by strands of wire $a$, as best shown in Fig. 8.

In order to support the band A, I prefer to provide a suitable harness-like frame composed of straps B, as shown in Fig. 1, which are provided with the guides C, preferably pulleys having tubes or frames D, forming casings for the pulleys and abutments for engagement by the stops E on the hanger-lines presently described. The band A is preferably supported by line-wires which are formed, as shown in Fig. 1, in branches F, F', and $F^2$, leading over their respective pulleys, thence through the casings or stop-tubes D in rear of such pulleys and merging in a main wire $F^3$, which is suitably looped at $F^4$ for engagement with the securing device, as shown in Figs. 2, 5, and 6. Each line-wire is provided in rear of its respective guide with a stop E to engage the casing or stop D when the band A is lowered and so limit the downward movement of the band A. These stops E are preferably split rings and are secured to the line-wires by coiling them at $e$ through the said wire, as will be understood from Fig. 7.

From the foregoing it will be understood that if the driver draws the loop $F^4$ back into the vehicle and secures it the band A will be held up above the animal's legs and will not interfere with his free movement, while if the loop $F^4$ be released the band A will quickly drop to the dotted-line position shown in Fig. 1 and hold the animal so he cannot run away.

To securely hold the line and release it when desired, I provide in the vehicle a line-securing device which may be conveniently operated and includes means for securing the line-wire when retracted, can be operated to release said wire, and has means which facilitate the retracting of the line-wire when it is desired to lift the band A to the full-line position shown in Fig. 1. This securing device is shown in Fig. 1 and in detail in Figs. 2 to 6, inclusive, and comprises a hook G, forming a part of a pivoted wheel H, whose rim is divided at I to form the hook G, together with a suitable casing J, which operates in the position of the wheel shown in Figs. 1 and 2 to close the hook G, and yet permits the hook G to open when adjusted to the position shown in Fig. 5. The hook-wheel H is actuated by a spring K normally to the position shown in Fig. 2, in which position the hook is closed and secures the loop $F^4$ at the end of the line-wire. The spring K is connected by a cord K', passing under a pulley $K^2$, with the wheel H, so it will properly exert its tension on the said wheel at all times.

The casing J is provided with a roller or drum J', located in rear of the hook G when the latter is in closed position. This drum J' is best shown in Fig. 6 and receives a retracting line or connection J², which is secured to the loop F⁴, so such drum J' can be used in retracting the band-supporting lines in readjusting the band A from the position indicated in dotted lines, Fig. 1, to the full-line position shown in the same figure.

For opening the hook G or adjusting the wheel H from the position shown in Fig. 2 to that shown in Fig. 5 I prefer to employ the treadle-lever L, which is pivoted at L' and has at L² a sliding connection with the wheel H, the lever L being slotted to receive a pin L³ on the wheel H, and a spring or springs L⁴ being arranged to operate between said pin and lever, as will be understood from Figs. 2 and 5. In the operation of the device with the parts B as shown in Fig. 2 the hook can be readily opened by depressing the lever L from the position shown in Fig. 2 to that shown in Fig. 5.

Having thus described my invention, what I claim, and desire to secure by Letters Patent, is—

1. In an apparatus substantially as described the combination of the pivoted wheel having a broken rim forming a hook, a spring by which said wheel is actuated in one direction, and a treadle-lever for operating the wheel in the opposite direction substantially as set forth.

2. In an apparatus substantially as described, the combination of the band for encircling the animal's legs, the line-wire and connections for raising and lowering said band, the hook for securing the line-wire when retracted to elevate the band and a casing for said hook having a drum in rear of the hook and a connection between said drum and the line-wire whereby to retract the latter substantially as set forth.

3. In an apparatus substantially as described the band adapted to extend around and inclose all the legs of the animal, the hanger-lines therefor, individual guides for said lines having pulleys and casings, stop projections on the lines arranged to engage the casings whereby to limit the downward movement of the band and devices for securing and releasing said lines substantially as set forth.

4. An apparatus substantially as described comprising a band adapted to inclose all of the legs of the animal, lines for suspending said band, and a frame forming a support for said band and provided at intervals with individual guides for the lines by which said band is suspended, and means whereby said lines may be held to secure the band elevated and released to lower said band substantially as set forth.

ALEXANDER WHELAN.

Witnesses:
SOLON C. KEMON,
PERRY B. TURPIN.